United States Patent [19]
Yoshida et al.

[11] Patent Number: 6,039,400
[45] Date of Patent: Mar. 21, 2000

[54] SEAT RECLINING DEVICE

[75] Inventors: Tomonori Yoshida, Yokohama; Moriyuki Eguchi, Kanagawa, both of Japan

[73] Assignee: Ikeda Bussan Co., Ltd., Ayase, Japan

[21] Appl. No.: 09/102,651

[22] Filed: Jun. 22, 1998

[30] Foreign Application Priority Data

Aug. 27, 1997 [JP] Japan ................................ 9-244858

[51] Int. Cl.<sup>7</sup> ................................................ B60N 2/20
[52] U.S. Cl. ........................................ 297/367; 297/378.12
[58] Field of Search ............................ 297/367, 378.12

[56] References Cited

U.S. PATENT DOCUMENTS

| | | | |
|---|---|---|---|
| 3,879,802 | 4/1975 | Werner | 297/367 X |
| 4,087,885 | 5/1978 | Gillentine | 297/367 X |
| 4,348,050 | 9/1982 | Letournoux et al. | 297/367 X |
| 4,736,986 | 4/1988 | Kato et al. | 297/367 |
| 4,997,223 | 3/1991 | Croft | 297/367 |
| 5,161,856 | 11/1992 | Nishino | 297/367 |
| 5,216,936 | 6/1993 | Baloche | 297/367 X |
| 5,590,931 | 1/1997 | Fourrey et al. | 297/367 X |
| 5,622,407 | 4/1997 | Yamada et al. | 297/367 X |
| 5,681,086 | 10/1997 | Baloche | 297/367 |
| 5,692,589 | 12/1997 | Beguin | 297/367 X |
| 5,727,846 | 3/1998 | Yoshida | 297/373 |
| 5,749,624 | 5/1998 | Yoshida | 297/367 |
| 5,762,400 | 6/1998 | Okazaki et al. | 297/367 |
| 5,769,494 | 6/1998 | Barrere et al. | 297/367 |
| 5,779,313 | 7/1998 | Rohee | 297/367 |
| 5,788,325 | 8/1998 | Ganot | 297/367 X |
| 5,816,656 | 10/1998 | Hoshihara et al. | 297/367 |

FOREIGN PATENT DOCUMENTS

| | | |
|---|---|---|
| 6-125821 | 5/1994 | Japan . |
| 9-28496 | 2/1997 | Japan . |
| 9-131237 | 5/1997 | Japan . |

*Primary Examiner*—Peter M. Cuomo
*Assistant Examiner*—Rodney B. White
*Attorney, Agent, or Firm*—Foley & Lardner

[57] ABSTRACT

A seat reclining device comprises a first plate secured to a rear part of a seat cushion and a second plate secured to a seatback. The first and second plates have first and second circulate openings. A drive shaft passes through the first and second circular openings. A lock mechanism is actuated by the drive shaft. The lock mechanism is interposed between the first and second plates to lock the second plate at a desired angular position relative to the first plate when the drive shaft is turned in a first direction and cancel the locked condition of the second plate when the drive shaft is turned in a second direction. A coil spring is disposed about the drive shaft and neatly put in the first circular opening. The coil spring is incorporated with the lock mechanism in such a manner as to bias the lock mechanism to is assume the locked condition of the second plate.

7 Claims, 3 Drawing Sheets

SEAT RECLINING DEVICE

BACKGROUND OF THE INVENTION

1. Field of the Invention

The present invention relates in general to seat reclining devices, and more particularly to seat reclining devices of a type which comprises a base member secured to a seat cushion, a pivot arm pivotally connected to the base member and secured to a seatback, a lock mechanism arranged between the base member and the pivot arm, a control lever for canceling a locked condition of the lock mechanism when pivoted in an unlocking direction and a lock spring for biasing the control lever in a locking direction.

2. Description of the Prior Art

Various types of seat reclining devices have been proposed and put into practical use particularly in the field of automotive seats. Some of them are shown in Japanese Patent First Provisional Publications 6-125821, 9-28496 and 9-131237. The reclining devices of these publications are of a type which has, for biasing a control lever in a locking direction, a lock spring in a lock mechanism. However, the conventional seat reclining devices of these publications fail to satisfy users due to costly and bulky construction.

SUMMARY OF THE INVENTION

It is therefore an object of the present invention to provide a low-cost and simple seat reclining device.

According to a first aspect of the present invention, there is provided a seat reclining device for a seat having a seat cushion and a seatback which is pivotal relative to the seat cushion. The seat reclining device comprises a first plate secured to a rear part of the seat cushion, the first plate having a first circular opening formed therein; a second plate secured to a lower end of the seatback, the second plate having a second circular opening formed therein; a drive shaft passing through the first and second circular openings of the first and second plates; a lock mechanism actuated by the drive shaft, the lock mechanism being interposed between the first and second plates to lock the second plate at a desired angular position relative to the first plate when the drive shaft is turned in a first direction and release the locked condition of the second plate when the drive shaft is turned in a second direction; and a coil spring disposed about the drive shaft and neatly put in the first circular opening, the coil spring being incorporated with the lock mechanism in such a manner as to bias the lock mechanism to assume the locked condition of the second plate.

According to a second aspect of the present invention, there is provided a seat reclining device for a seat having a seat cushion and a seatback which is pivotal relative to the seat cushion. The seat reclining device comprises first and second units, a drive shaft extending between the first and second units and a control lever fixed to one end of the drive shaft. Each unit comprises a first plate secured to a rear part of the seat cushion, the first plate having a first circular opening through which the drive shaft passes; a second plate secured to a lower end of the seatback, the second plate having a second circular opening through which the drive shaft passes; a lock mechanism actuated by the drive shaft, the lock mechanism being interposed between the first and second plates to lock the second plate at a desired angular position relative to the first plate when the drive shaft is turned in a first direction and release the locked condition of the second plate when the drive shaft is turned in a second direction; and a coil spring disposed about the drive shaft and neatly put in the first circular opening, the coil spring being incorporated with the lock mechanism in such a manner as to bias the lock mechanism to assume the locked condition of the second plate.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
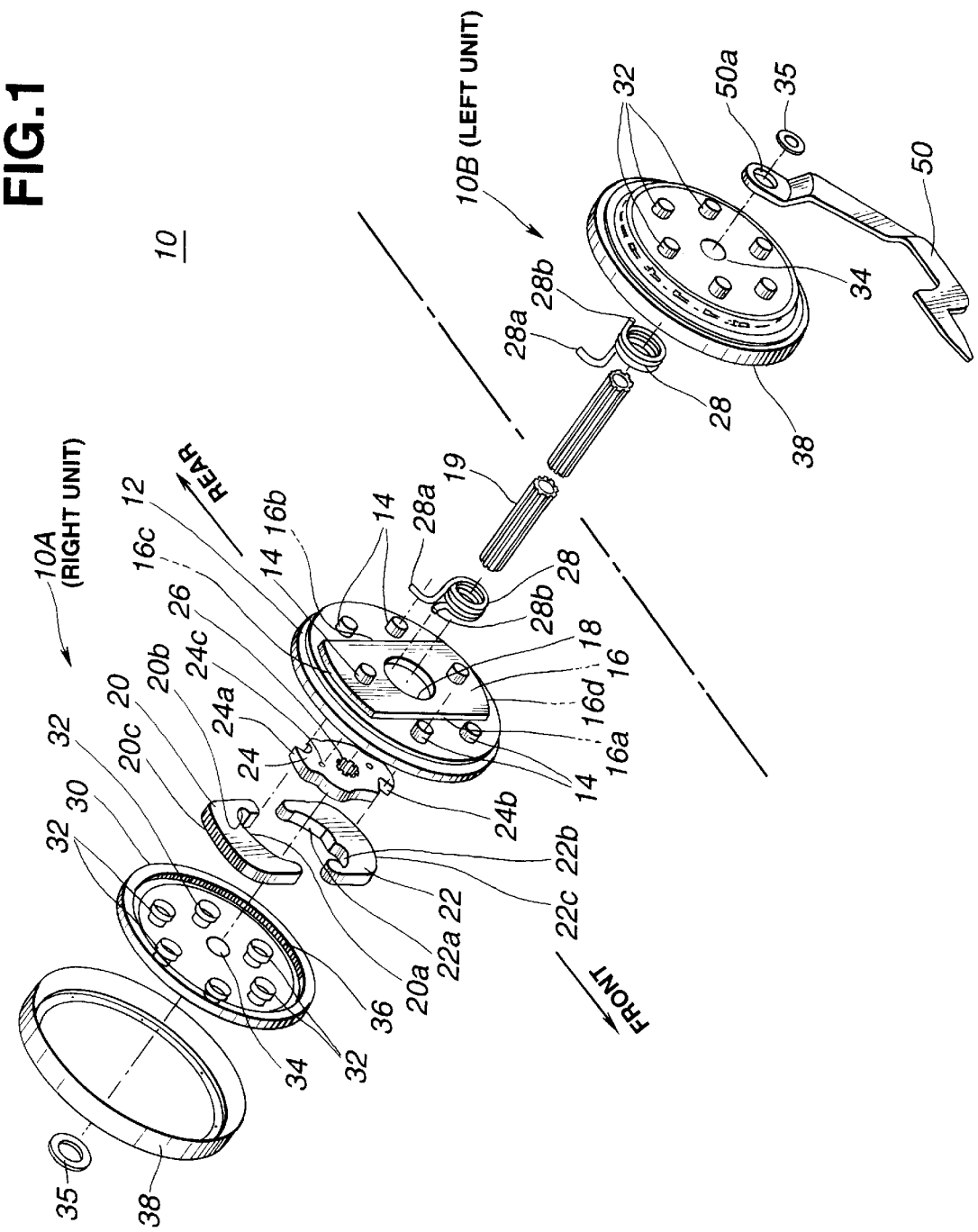
FIG. 1 is an exploded view of a seat reclining device of the present invention, which comprises a pair of, that is, right and left units, the right unit being shown in an exploded condition and the left unit being shown in an assembled condition.
Figure 2:
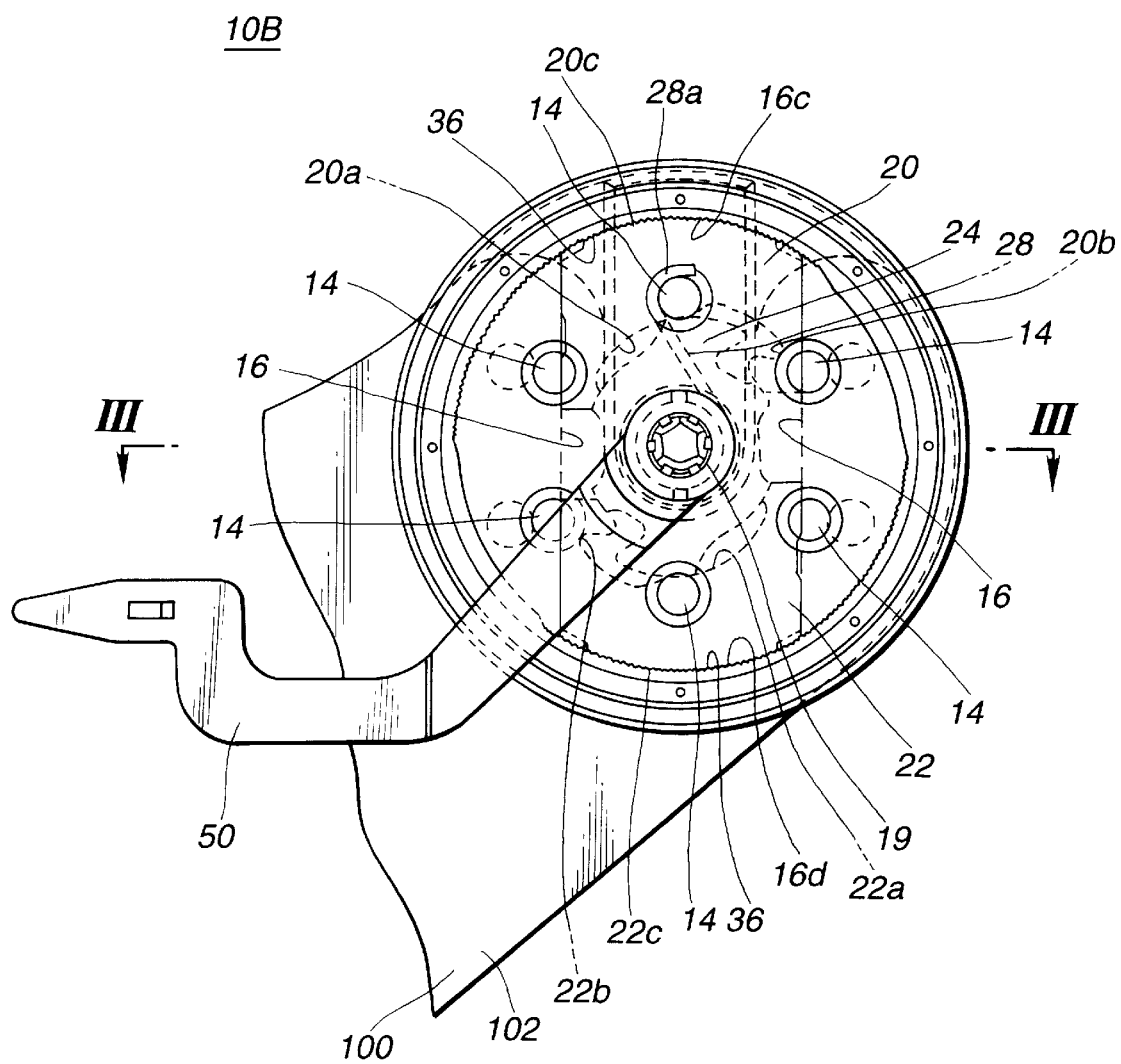
FIG. 2 is an enlarged view of the left unit, which is taken from the direction of the arrow "II" of FIG. 1 with some parts removed for clarification of the drawing.
Figure 3:
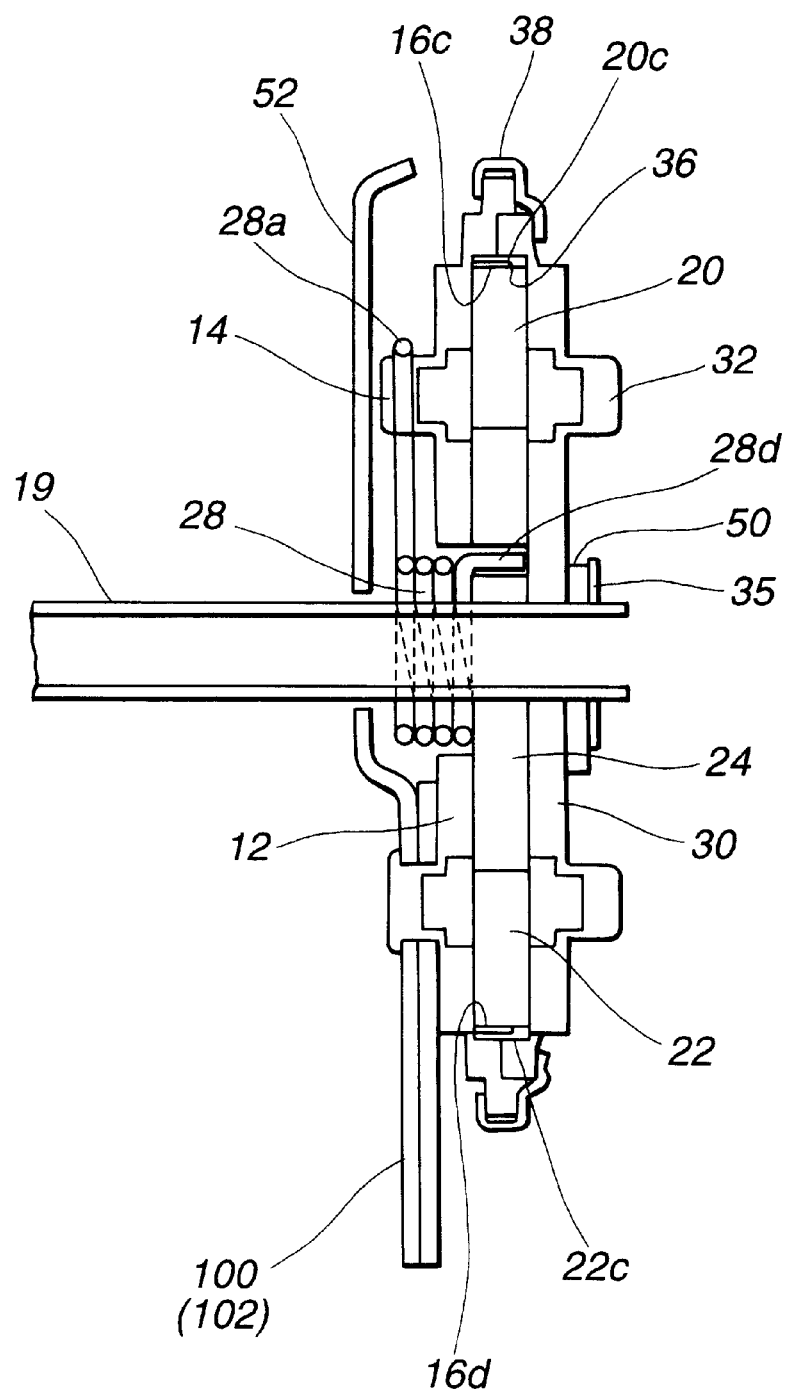
FIG. 3 is a sectional view taken along the line "III-III" of FIG. 2.

Referring to FIGS. 1 to 3, there is shown a seat reclining device 10 according to the present invention.

Although not shown in the drawings, the seat reclining device 10 is mounted on an automotive seat which comprises generally a seat cushion, a seatback pivotally connected to a rear end of the seat cushion and a seat slide device on which the seat cushion is mounted. The seat slide device comprises parallel lower rails fixed to a floor of the vehicle, upper rails 100 (see FIGS. 2 and 3) slidably engaged with the lower rails, a position lock mechanism for locking the upper rails 100 to the lower rails at a desired fore-and-aft position and a control lever for canceling the locked condition of the position lock mechanism when manipulated. The upper rails 100 has the seat cushion mounted thereon.

As is understood from FIG. 2, the upper rails 100 have each a plate like rear end 102 which is raised vertically. The reclining device 10 of the invention is incorporated with the raised rear ends 102 of the upper rails 100 as will become apparent as the description proceeds.

As is seen from FIG. 1, the reclining device 10 comprises generally two, that is, right and left units 10A and 10B which are substantially the same in construction and respectively connected to right rear and left rear portions of the seat in such a manner as will be described in the following.

For ease of description, detailed description on construction will be directed to only the right unit 10A with reference to FIG. 1. FIGS. 2 and 3 show the left unit 10B, which are provided for showing a difference of the left unit 10B from the right unit 10A.

As is seen from FIG. 1, the right unit 10A comprises a circular base plate 12 which is secured to the raised rear end 102 of the right upper rail 100. For this securing, the circular base plate 12 is formed with a plurality of bosses 14 which are mated with openings (not shown) formed in the raised rear end 102. Welding or the like is used for assuring the mating.

The circular base plate 12 is formed with a generally rectangular recess 16 which is defined by two straight and parallel side walls 16a and 16b and upper and lower arcuate walls 16c and 16d. The upper and lower arcuate walls 16c and 16d are concentric with a center opening 18 of the base plate 12. The center opening 18 has a drive shaft 19 loosely passed therethrough.

As will become apparent hereinafter, the drive shaft 19 extends between the right and right units and serves as a pivot shaft about which the seatback pivots relative to the seat cushion.

As will be understood from FIG. 2, the upper and lower arcuate walls 16c and 16d are each formed with teeth (no numerals).

Referring back to FIG. 1, within the rectangular recess 16, there are slidably received two inner pieces 20 and 22 which face each other at their inner cam surfaces 20a and 22a with the center opening 18 positioned therebetween. Each of the inner pieces 20 and 22 is formed at one end of the inner cam surface 20a or 22a with an engaging recess 20b or 22b. Furthermore, each inner piece 20 or 22 is formed at a radially outer surface with gear teeth 20c or 22c which are engageable with the teeth of the upper or lower arcuate wall 16c or 16d of the rectangular recess 16 when the inner piece 20 or 22 assumes a radially outermost position in the rectangular recess 16.

It is to be noted that the thickness of each inner piece 20 or 22 is greater than the depth of the rectangular recess 16, so that each inner piece 20 or 22 projects but slightly from the recess 16.

Within the rectangular recess 16, there is also received a cam 24 which is located between the two inner pieces 20 and 22. The cam 24 is formed with a center opening 26 through which the drive shaft 19 passes. Although not shown, the center opening 26 is shaped to have a star-like cross section and securely mated to a counterpart of the drive shaft 19, so that the cam 24 rotates together with the drive shaft 19. The cam 24 is formed with two pawl portions 24a and 24b which respectively slide on the inner cam surfaces 20a and 22a of the inner pieces 20 and 22 to move the inner pieces 20 and 22 in diametrically opposite directions in the rectangular recess 16. That is, when, due to rotation of the drive shaft 19, the cam 24 comes to an angular position to put the pawl portions 24a and 24b into the engaging recesses 20b and 22b of the inner pieces 20 and 22, the inner pieces 20 and 22 assume radially innermost positions in the rectangular recess 16. In these positions, the gear teeth 20c and 22c of the two inner pieces 20 and 22 are separated from the teeth of the upper and lower arcuate walls 16c and 16d of the circular base plate 12.

Within the center opening 18 of the circular base plate 12, here is disposed a coil spring 28 which is disposed about the rive shaft 19. One end 28a of the spring 28 is hooked to one of he bosses 14 and the other end 28b is engaged with an opening 24c of the cam 24, so that the cam 24 and the drive shaft 19 are biased to rotate in a counterclockwise direction in FIG. 1, that is, in a direction to push the inner pieces 20 and 22 toward the radially outermost positions.

The right unit 10A further comprises a ring plate 30 which is rotatably coupled with the circular base plate 12. The ring plate 30 is secured to a lower end of a right side frame (not shown) of the seatback. For this securing, the ring plate 30 is formed with a plurality of bosses 32 which are mated with openings (not shown) formed in the right side frame. Welding or the like is used for assuring the mating.

The ring plate 30 is formed with a center opening 34 through which the drive shaft 19 loosely passes. An end of the drive shaft 19 projected from the center opening 34 has a snap ring 35 fixed thereto for holding the ring plate 30 in position. The ring plate 30 is integrally formed with a ring gear 36. The ring gear 36 has a diameter identical to that of an imaginary circle which is partially constituted by the upper and lower arcuate walls 16c and 16d of the circular base plate 12. That is, the teeth of the ring gear 36 and the teeth of the upper and lower arcuate walls 16c and 16d are arranged side by side with a unit of the two inner pieces 20 and 22 and the cam 26 located therebetween. Thus, when the inner pieces 20 and 22 assume their radially outermost positions in the rectangular recess 16, the gear teeth 20c or 22c of each inner piece 20 or 22 is engaged with both the teeth of the upper or lower arcuate wall 16c or 16d of the circular base plate 12 and the teeth of the ring gear 36 of the ring plate 30. In this condition, the ring plate 30 is locked to the circular base plate 12. Usually, due to biasing force of the spring 28, this locked condition is kept permitting the seatback to assume a desired angular position locked relative to the seat cushion, as will be described in detail hereinafter. An annular cover 38 is arranged to house both the ring plate 30 and the circular base plate 12.

As will be understood from FIG. 3, an inner side of the right unit 10A (and left unit 10B) is concealed by a cover part 52 constituted by the plate like rear end 102 of the upper rail 100. The cover part 52 has an opening (no numeral) through which the drive shaft 19 passes.

In the following, the left unit 10B will be briefly described with reference to the drawings for explaining a difference of the left unit 10B from the above-mentioned right unit 10A. As has been mentioned hereinabove.

As is best seen from FIG. 1, the left unit 10B further comprises a control lever 50 which has a base end 50a fixed to an exposed left end of the drive shaft 19. As will be understood from the following, when it is needed to set the seatback at a new angular position, the control lever 50 is pivoted upward, that is, in a clockwise direction in FIG. 1.

In the following, operation of the seat reclining device 10 will be described.

For ease of understanding, explanation of the operation will be commenced with respect to a locked condition of the device 10, as is shown in FIG. 2. In this locked condition, the inner pieces 20 and 22 of each unit 10A or 10B assume their radially outermost positions in the rectangular recess 16. Thus, the gear teeth 20c and 22c of the inner pieces 20 and 20 are in engagement with both the teeth of the upper and lower arcuate walls 16c and 16d of the circular base plate 12 and the teeth of the ring gear 36 of the ring plate 30. That is, in this condition, the ring plate 30 secured to the seatback is locked relative to the circular base plate 12 secured to the seat cushion. Thus, the seatback is locked at a certain angular position relative to the seat cushion.

When, for the purpose of changing the angular position of the seatback, the control lever 50 is pivoted clockwise in FIGS. 1 and 2 against the biasing force of the two springs 28, the drive shaft 19 is pivoted in the same direction rotating the respective cams 24 of the right and left units 10A and 10B in the same direction. With this, the inner pieces 20 and 22 of each unit 10A or 10B are moved to the radially innermost positions in the rectangular recess 16, separating the gear teeth 20c and 22c thereof from both the teeth of the upper and lower arcuate walls 16c and 16d of the circular base plate 12 and the teeth of the ring gear 36 of the ring plate 30. Thus, in this condition, the seat reclining device 10 assumes an unlocked condition, so that the seatback can be freely pivoted when applied with a suitable external force. Thus, when the seatback is pivoted to a desired new angular position and then the control lever 50 is released, the drive shaft 19 and thus each cam 24 of the unit 10A or 10B is pivoted counterclockwise due to the biasing force of the springs 28, moving the inner pieces 20 and 22 to the radially outermost positions in the rectangular recess 16. Thus, the seat reclining device 10 assumes the locked condition locking the seatback at the desired new angular position relative to the seat cushion.

In the following, advantages of the seat reclining device 10 of the invention will be described.

First, since the right and left units 10A and 10B are substantially the same in construction, production of the units can be made with a reduced cost.

Second, each of the units 10A and 10B has a compact structure, which can improve aesthetic value of the automotive seat, particularly, a rear end portion of the seat cushion.

Third, since the coil spring 28 is neatly received in the center opening 18 of the circular base plate 12, the thickness of the unit 10A or 10B can be minimized. In fact, the number of turns of the spring 28 can be determined by the thickness of the unit.

What is claimed is:

1. A seat reclining device for a seat having a seat cushion and a seatback which is pivotal relative to said seat cushion, comprising:

a first plate adapted to be secured to a rear part of the seat cushion, said first plate having a first circular opening formed therein;

a second plate adapted to be secured to a lower end of said seatback, said second plate having a second circular opening formed therein;

a drive shaft passing through said first and second circular openings of said first and second plates;

a lock mechanism actuated by said drive shaft, said lock mechanism being interposed between said first and second plates to lock said second plate at a desired angular position relative to said first plate and assume a lock condition when said drive shaft is turned in a first direction and cancel the locked condition of said second plate when said drive shaft is turned in a second direction; and a coil spring disposed about said drive shaft and positioned in said first circular opening, said coil spring being incorporated with said lock mechanism in such a manner as to bias said lock mechanism to assume the locked condition of said second plate.

2. A seat reclining device as claimed in claim 1, in which said lock mechanism comprises:

a generally rectangular recess formed in said first plate, said recess including first and second toothed arcuate walls which face each other;

a ring gear possessed by said second plate, said ring gear having a diameter identical to that of an imaginary circle which is partially constituted by said first and second toothed arcuate walls;

a pair of inner pieces slidably received in said rectangular recess, each inner piece having gear teeth which are lockingly engaged with both one of said first and second toothed arcuate walls and said ring gear when assuming a radially outermost position in said rectangular recess; and a cam rotatably interposed between said inner pieces and tightly disposed on said drive shaft, said cam moving each of said inner pieces to said radially outermost position when said drive shaft is turned in said first direction, wherein said coil spring has one end hooked to a portion of said first plate and the other end hooked to a portion of said cam.

3. A seat reclining device as claimed in claim 2, in which said cam of said lock mechanism is formed with a center opening with which said drive shaft is engaged in a spline connection.

4. A seat reclining device as claimed in claim 2, further comprising a control lever which is fixed to one end of said drive shaft to pivot therewith.

5. A seat reclining device as claimed in claim 4, in which said first plate is formed with a plurality of bosses which are adapted to be mated with openings formed in a frame of said seat cushion, and in which said second plate is formed with a plurality of bosses which are adapted to be mated with openings formed in a frame of said seatback.

6. A seat reclining device as claimed in claim 5, further comprising a cover member which conceals one side of said coil spring, said cover member being adapted to be integrated with the frame of said seat cushion.

7. A seat reclining device for a seat having a seat cushion and a seatback which is pivotal relative to said seat cushion, said seat reclining device comprising first and second units, a drive shaft extending between said first and second units, and a control lever fixed to one end of said drive shaft, each unit including:

a first plate adapted to be secured to a rear part of the seat cushion, said first plate having a first circular opening through which said drive shaft passes;

a second plate adapted to be secured to a lower end of said seatback, said second plate having a second circular opening through which said drive shaft passes;

a lock mechanism adapted to be actuated by said drive shaft, said lock mechanism being interposed between said first and second plates to lock said second plate at a desired angular position relative to said first plate to assume a lock condition when said drive shaft is turned in a first direction and release the locked condition of said second plate when said drive shaft is turned in a second direction; and a coil spring adapted to be disposed about said drive shaft and positioned in said first circular opening, said coil spring being incorporated with said lock mechanism in such a manner as to bias said lock mechanism to assume the locked condition of said second plate.

* * * * *